(12) United States Patent
Park et al.

(10) Patent No.: US 8,284,340 B2
(45) Date of Patent: Oct. 9, 2012

(54) LIQUID CRYSTAL DISPLAY DEVICE

(75) Inventors: Sung Il Park, Dalseo-gu (KR); Sang Moo Song, Gumi-si (KR); Dae Hyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 221 days.

(21) Appl. No.: 12/537,061

(22) Filed: Aug. 6, 2009

(65) Prior Publication Data

US 2010/0079717 A1 Apr. 1, 2010

(30) Foreign Application Priority Data

Oct. 1, 2008 (KR) .................. 10-2008-0096852

(51) Int. Cl.
*G02F 1/1333* (2006.01)
(52) U.S. Cl. ............ 349/54; 349/192; 349/149; 349/139
(58) Field of Classification Search .......... 349/149–152, 349/139, 54, 192; 324/765
See application file for complete search history.

(56) References Cited

U.S. PATENT DOCUMENTS

| | | | |
|---|---|---|---|
| 6,111,620 A | 8/2000 | Nishiki et al. | |
| 7,251,009 B2* | 7/2007 | Hayata et al. | 349/149 |
| 2002/0027621 A1* | 3/2002 | Chae | 349/40 |
| 2006/0012743 A1* | 1/2006 | Yun et al. | 349/149 |
| 2006/0033857 A1* | 2/2006 | Kim et al. | 349/54 |
| 2006/0284633 A1* | 12/2006 | Park | 324/765 |
| 2007/0139570 A1* | 6/2007 | Ohgiichi et al. | 349/40 |
| 2008/0137021 A1* | 6/2008 | Choi et al. | 349/150 |
| 2008/0265253 A1* | 10/2008 | Tian et al. | 257/59 |
| 2009/0207369 A1* | 8/2009 | Lin et al. | 349/152 |

FOREIGN PATENT DOCUMENTS

| | | |
|---|---|---|
| KR | 10-0235169 B1 | 12/1999 |
| KR | 10-2003-0057043 A | 7/2003 |

* cited by examiner

*Primary Examiner* — Edward Glick
*Assistant Examiner* — Sang Nguyen
(74) *Attorney, Agent, or Firm* — Birch, Stewart, Kolasch & Birch, LLP

(57) ABSTRACT

An LCD device preventing a short-circuit of adjacent link lines is disclosed. The LCD device includes a pixel area in which a plurality of gate lines and a plurality of data lines crossing the plurality of gate lines at a right angle are formed, a pad area formed at a side of the pixel area, a gate pad portion and a data pad portion formed in the pad area and respectively connected to the plurality of gate lines and the plurality of data lines, first, second, third, and fourth gate link lines connected to the plurality of gate lines and the gate pad portion and alternately arranged with an insulation layer interposed between the first, second, third, and fourth gate link lines, and first and second auto probe pads electrically connected to the first, second, third, and fourth gate link lines. The first and second gate link lines are connected to the first auto probe pad and the third and fourth gate link lines are connected to the second auto probe pad.

8 Claims, 6 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0096852, filed on Oct. 1, 2008, which is hereby incorporated by reference in its entirety.

BACKGROUND

1. Field of the Disclosure

This disclosure relates to a liquid crystal display (LCD) device, and more particularly to an LCD device which prevents generation of a short-circuit between adjacent ones of the link lines formed in the same layer.

2. Description of the Related Art

LCD devices which recently receive attention as flat panel display devices exhibit a high contrast ratio, superior gradation or motion picture display, and low power consumption and are actively being developed. In particular, since the LCD device can be manufactured with a thin thickness, the LCD device may be used as an ultra-thin display device such as wall mount TVs. Also, due to its light weight and low power consumption characteristics, compared to cathode ray tubes (CRTs), the LCD device is used as displays for laptops operated by batteries and thus highlighted as one of the next generation display devices.

The LCD device includes a thin film transistor (TFT) array substrate where a TFT and a pixel electrode are formed in each pixel area defined by a gate line and a data line, a color filter substrate in which a color filter layer and a common electrode are formed, and a liquid crystal layer interposed between the TFT array substrate and the color filter substrate. Liquid crystal molecules in the liquid crystal layer are rearranged by applying a voltage to the electrodes. Thus, an image is displayed by controlling the quantity of light being transmitted.

Also, the LCD device can be manufactured into a compact panel and thus used in a variety of applied fields, for example, mobile phone displays.

FIG. 1 is a plan view of a general compact LCD device. FIG. 2 is a cross-sectional view showing the connection relationship between an auto probe pad and a gate link line. Referring to FIG. 1, a TFT array substrate 1 includes an active region 13 in which a plurality of pixel areas are defined by a plurality of gate lines G1, G2, G3, . . . , Gn-2, Gn-1, and Gn and a plurality of data lines D1, D2, D3, . . . , Dm-2, Dm-1, and Dm which cross each other, and an non-active region 14 connected by a gate pad and a data pad to a printed circuit board (not shown) that is an external driving circuit.

In detail, in the active region 13, the plurality of gate lines G1, G2, G3, . . . , Gn-2, Gn-1, and Gn and the plurality of data lines D1, D2, D3, . . . , Dm-2, Dm-1, and Dm are formed crossing each other. A TFT is formed as a switching device at a portion where each gate line and each data line cross each other. The TFT is connected to a pixel electrode with a protection layer interposed therebetween.

In the non-active region 14, a pad area 12 having a plurality of gate pad portions 15 for applying a gate driving signal to each of the gate lines G1, G2, G3, . . . , Gn-2, Gn-1, and Gn and a plurality of data pad portions 16 for applying a data signal to each of the data lines D1, D2, D3, . . . , Dm-2, Dm-1, and Dm is formed to interface an electric signal with an external driving circuit. For compact liquid crystal panels used for monitors of mobile phones, as shown in FIG. 1, the gate pad portions 15 and the data pad portions 16 are integrally arranged in a lower side of the liquid crystal panel in order to minimize the size of a pad portion area.

The gate pad portions 15 are formed at each end portion of a plurality of gate link lines LG1, LG2, LG3, . . . , LGn-2, LGn-1, and LGn, respectively, extending from the gate lines G1, G2, G3, . . . , Gn-2, Gn-1, and Gn. The data pad portions 16 are formed at each end portion of a plurality of data link lines LD1, LD2, LD3, . . . , LDm-2, LDm-1, and LDm, respectively, extending from the data lines D1, D2, D3, . . . , Dm-2, Dm-1, and Dm.

The gate link lines and the data link lines are arranged by being divided into an odd-numbered group and an even-numbered group. Any one of the groups is directly connected to the gate lines and the data lines. The other group are connected to the gate lines and the date lines via a contact hole formed in an insulation layer 22. As shown in FIG. 2, the gate link lines LG1, LG2, LG3, . . . , LGn-2, LGn-1, and LGn are divided into the two group of the odd-numbered gate link lines and the even-numbered gate link lines. Each link group is insulated by the gate insulation layer 22.

An auto probe pad 17 for testing driving of a liquid crystal panel is further provided in the pad area 12 and electrically connected to an auto probe (not shown) of a test equipment during the test of driving. The auto probe pad 17 is electrically connected each of the data link lines and the gate link lines. An electric signal applied from the test equipment during the test is applied to each of the data lines and the gate lines via the data link lines and the gate link lines so that the driving of a liquid crystal panel may be tested.

The auto probe pad 17 includes a plurality of pads which are arranged in parallel at a constant interval. As shown in FIG. 2, the first auto probe pad 25a that is any one of the pads is connected to the odd-numbered link line group while the second auto probe pad 25b is connected to the even-numbered link line group.

Since the link lines need to be formed in a narrow area, short-circuit (A in FIG. 2) is frequently generated between adjacent ones of the link lines formed in the same layer during the process of forming the link lines. Also, since an electric signal is equally applied to the first auto probe pad 25a, a short-circuit between the link lines generated in the odd-numbered gate link group connected to the first auto probe pad 25a may not be detected.

BRIEF SUMMARY

Accordingly, the present embodiments are directed to an LCD device that substantially obviates one or more of problems due to the limitations and disadvantages of the related art.

An object of the embodiment of the present disclosure is to provide an LCD device which prevents generation of short-circuit between adjacent ones of the link lines formed in the same layer.

Another object of the embodiment of the present disclosure is to provide an LCD device which detects short-circuit between the link lines generated in the gate link group connected to an auto probe pad.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes a pixel area in which a plurality of gate lines and a plurality of data lines crossing the plurality of gate lines at a right angle are formed, a pad area formed at a side of the pixel area, a gate pad portion and a data pad portion formed in the pad area and respectively connected to the plurality of gate lines and the plurality of data lines, first, second, third, and fourth gate link lines connected to the plurality of gate lines and the gate pad portion and alternately arranged with an insulation layer interposed between the first, second, third, and fourth gate link lines, and first and second auto probe pads electrically connected to the first, second, third, and fourth gate link lines. The first and second gate link lines are connected to the first auto probe pad and the third and fourth gate link lines are connected to the second auto probe pad.

The LCD device further includes first, second, third, and fourth data link lines connected to the plurality of data lines and the data pad portion and alternately arranged with the insulation layer interposed between the first, second, third, and fourth data link lines, and third and fourth auto probe pads electrically connected to the first, second, third, and fourth data link lines. The first and second data link lines are connected to the third auto probe pad and the third and fourth data link lines are connected to the fourth auto probe pad.

One of the first and second gate link lines extends from the plurality of gate lines and the other one of the first and second gate link lines is formed on the insulation layer interposed between the first and second gate link lines.

One of the first and second data link lines extends from the plurality of data lines and the other one of the first and second data link lines is formed on the insulation layer interposed between the first and second data link lines.

An LCD device according to another general aspect of the present embodiment, includes a pixel area in which a plurality of gate lines and a plurality of data lines crossing the plurality of gate lines at a right angle are formed, a pad area formed at a side of the pixel area, a gate pad portion and a data pad portion formed in the pad area and respectively connected to the plurality of gate lines and the plurality of data lines, first, second, and third gate link lines connected to the plurality of gate lines and the gate pad portion and alternately arranged with an insulation layer interposed between the first, second, and third gate link lines, and first, second, and third auto probe pads electrically connected to the first, second, third, and fourth gate link lines, wherein the first gate link line is connected to the first auto probe pad, the second gate link line is connected to the second auto probe pad, and the third gate link line is connected to the third auto probe pad.

The LCD device further includes: first, second, and third data link lines connected to the plurality of data lines and the data pad portion and alternately arranged with an insulation layer interposed between the first, second, and third data link lines; and fourth, fifth, and sixth auto probe pads electrically connected to the first, second, third, and fourth data link lines. The first data link line is connected to the fourth auto probe pad, the second data link line is connected to the fifth auto probe pad, and the third data link line is connected to the sixth auto probe pad.

One of the first and second gate link lines extends from the plurality of gate lines and the other one of the first and second gate link lines is formed on the insulation layer interposed between the first and second gate link lines.

One of the first and second data link lines extends from the plurality of data lines and the other one of the first and second data link lines is formed on the insulation layer interposed between the first and second data link lines.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
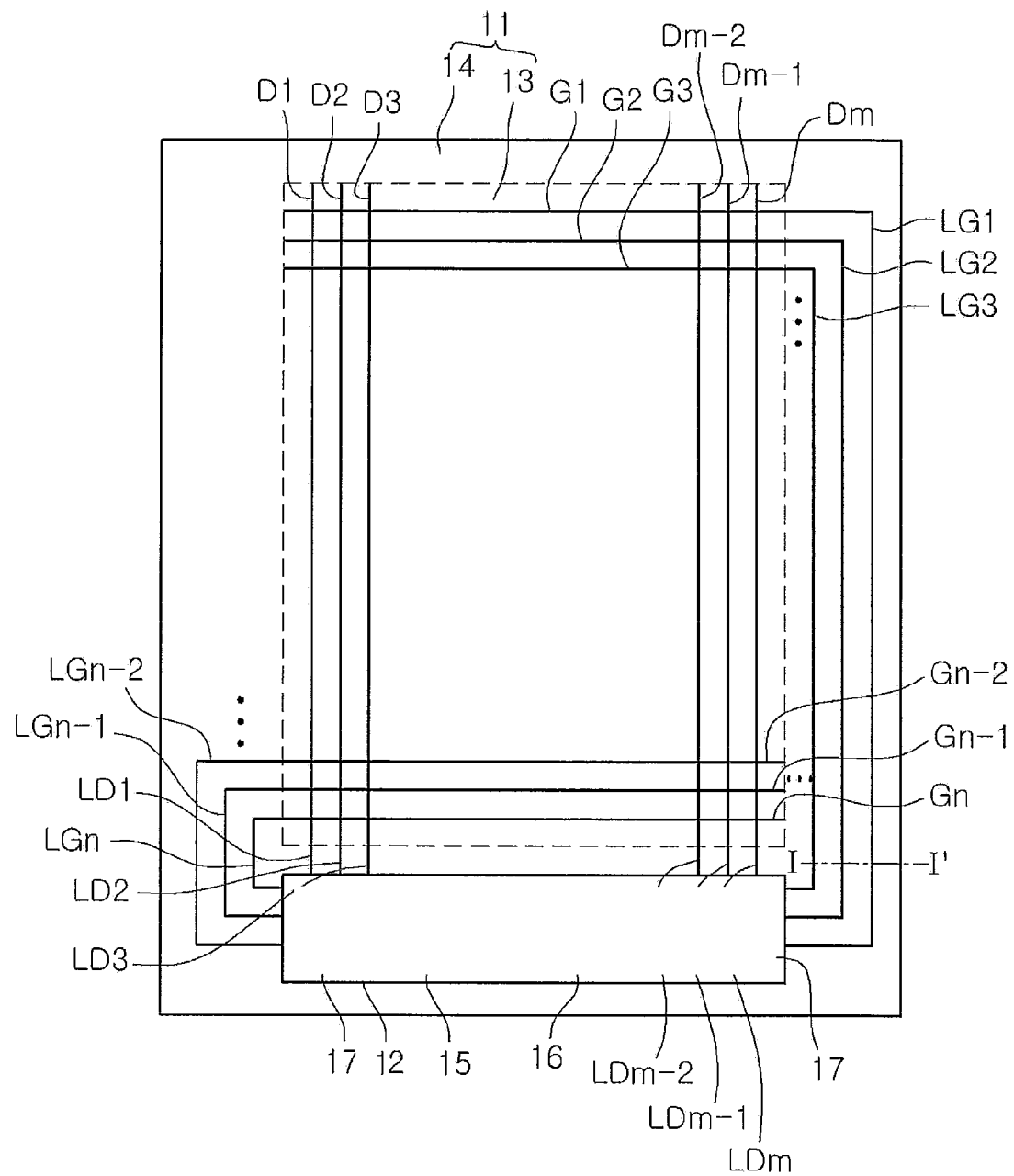
FIG. 1 is a plan view of a compact LCD device according to the related art.
Figure 2:
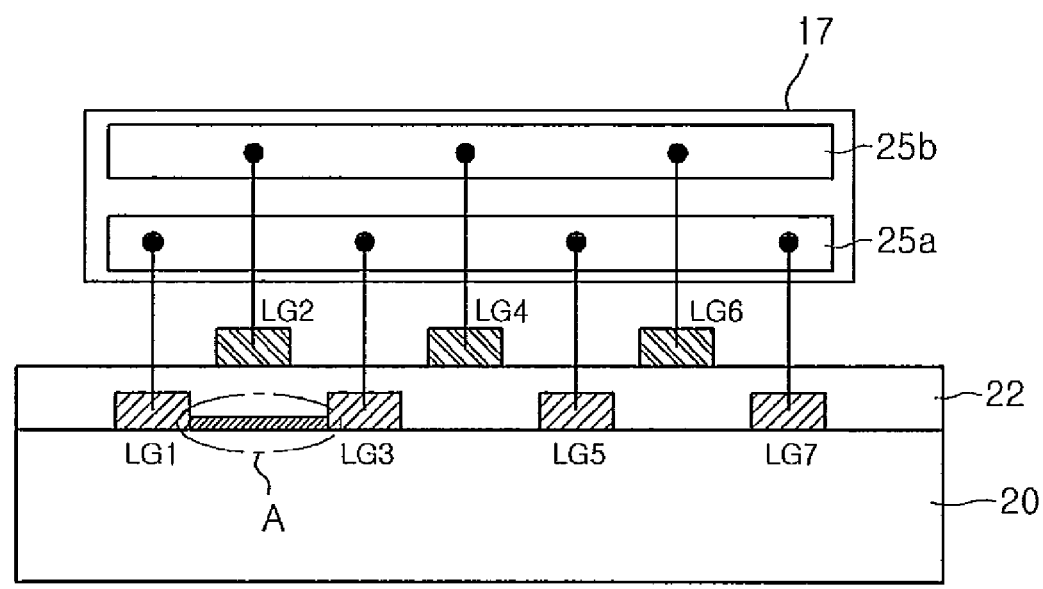
FIG. 2 is a cross-sectional view showing the connection relationship between the auto probe pad and the link lines.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 3:
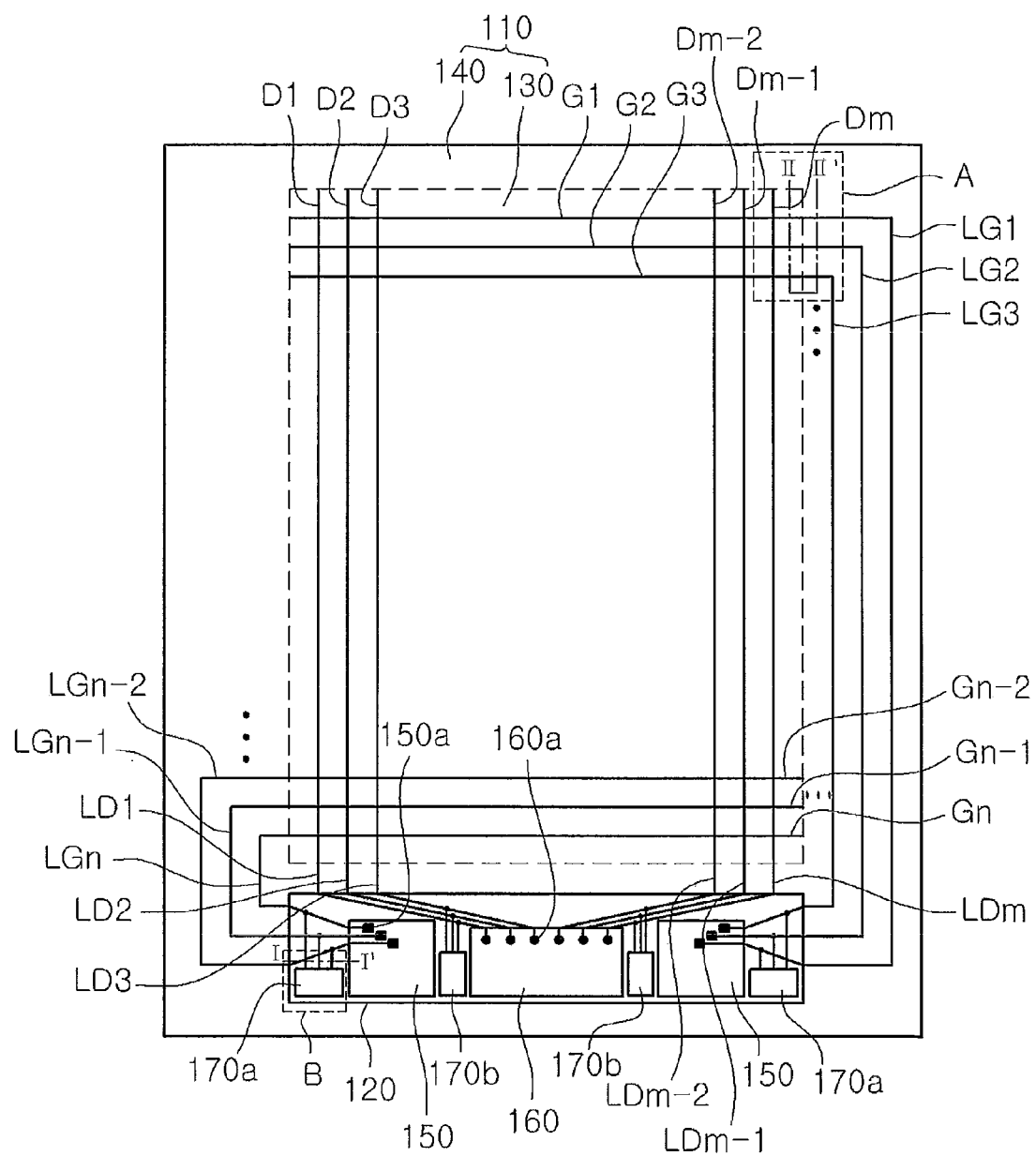
FIG. 3 is a plan view of a compact LCD device according to an embodiment of the present disclosure.

FIG. 3 is a plan view of a compact LCD device according to an embodiment of the present disclosure. Referring to FIG.

3, a TFT array substrate 110 includes an active region 130 in which a plurality of pixel areas are defined by a plurality of gate lines G1, G2, G3, ..., Gn-2, Gn-1, and Gn and a plurality of data lines D1, D2, D3, ..., Dm-2, Dm-1, and Dm which cross each other, and an non-active region 140 connected by a gate pad and a data pad to a printed circuit board (not shown) that is an external driving circuit.

In detail, in the active region 130, the plurality of gate lines G1, G2, G3, ..., Gn-2, Gn-1, and Gn and the plurality of data lines D1, D2, D3, ..., Dm-2, Dm-1, and Dm are formed crossing each other. A TFT is formed as a switching device at a portion where each gate line and each data line cross each other. The TFT is connected to a pixel electrode with a protection layer interposed therebetween.

A pad area 120 having a gate pad portion 150 and a data pad portion 160 is formed in the non-active region 140 to interface an electric signal with an external driving circuit. The gate pad portion 150 includes a plurality of gate pads 150a for applying a gate driving signal to each of the gate lines G1, G2, G3, ..., Gn-2, Gn-1, and Gn. The data pad portion 160 includes a plurality of data pads 160a for applying a data signal to each of the data lines D1, D2, D3, ..., Dm-2, Dm-1, and Dm.

The gate pads 150a of the gate pad portion 150 are formed at an end portion of each of the gate link lines LG1, LG2, LG3, ..., LGn-2, LGn-1, and LGn, respectively, extending from the gate lines G1, G2, G3, ..., Gn-2, Gn-1, and Gn. The data pad 160a of the data pad portion 160 are formed at an end portion of each of the data link lines LD1, LD2, LD3, ..., LDm-2, LDm-1, and LDm, respectively, extending from the data lines D1, D2, D3, ..., Dm-2, Dm-1, and Dm.

The gate link lines and the data link lines are arranged by being divided into an odd-numbered group and an even-numbered group. Any one of the groups is directly connected to the gate lines and the data lines. The other group is connected to the gate lines and the date lines via a contact hole formed in a gate insulation layer.

Figure 4A:
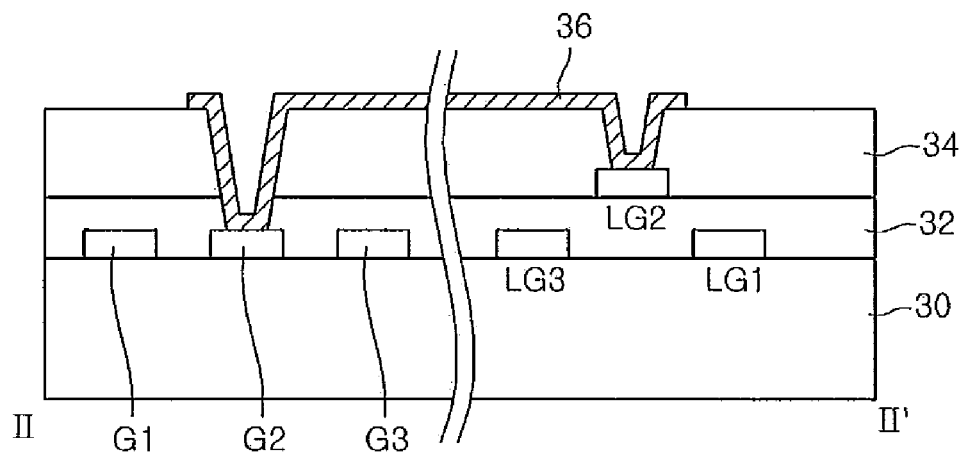
FIG. 4A is a cross-sectional view taken along line II-II' of FIG. 3.
Figure 4B:
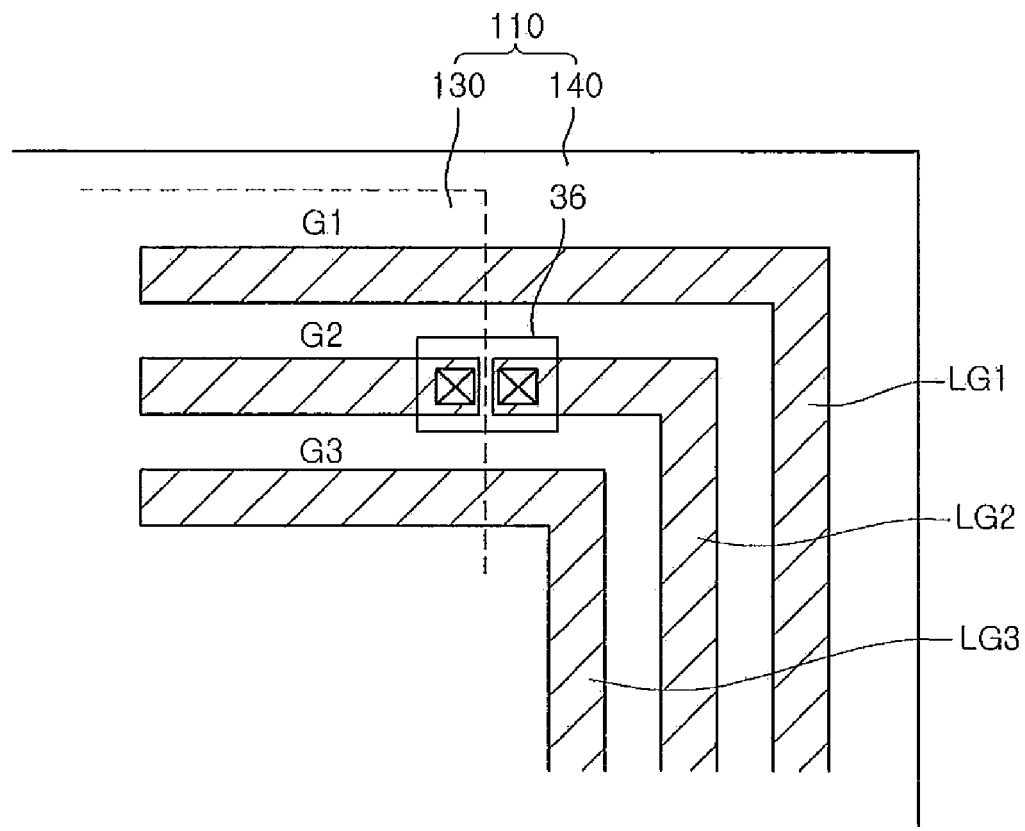
FIG. 4B is a magnified plan view of a portion A of FIG. 3.

FIG. 4A is a cross-sectional view taken along line II-II' of FIG. 3. FIG. 4B is a magnified plan view of a portion A of FIG. 3. Referring to FIG. 4A and 4B, the gate link lines LG1, LG2, and LG3 are divided into two groups of the odd-numbered gate link lines LG1 and LG 3 and the even-numbered gate link line LG2. Although it is not illustrated, the odd-numbered gate link lines LG1 and LG3 are directly connected to the odd-numbered gate lines G1 and G3. The even-numbered gate link line LG2 is connected to the even-numbered gate line G2 via a transparent conductive layer 36 passing a first contact hole and a second contact hole. The first contact hole penetrates a gate insulation layer 32 and a protection layer 34 to expose the even-numbered gate line G2. The second contact hole penetrates the protection layer 34 to expose the even-numbered gate link line LG2.

An auto probe pad 170a for the gate link lines and an auto probe pad 170b for the data link lines for testing driving of a liquid crystal panel are further provided in the pad area 120 and electrically connected to an auto probe (not shown) of a test equipment during the driving test, as shown in FIG. 3. The auto probe pad 170a for the gate link lines is electrically connected to the gate link lines connecting the gate pad 150a and the gate lines. The auto probe pad 170b for the data link lines is electrically connected to the data link lines connecting the data pad 160a and the data lines. During the test, an electric signal applied by the test equipment is applied to each of the data lines and the gate lines via the data link lines and the gate link lines through the auto probe pad 170b for the data link lines and the auto probe pad 170a for the gate link lines.

Figure 5A:
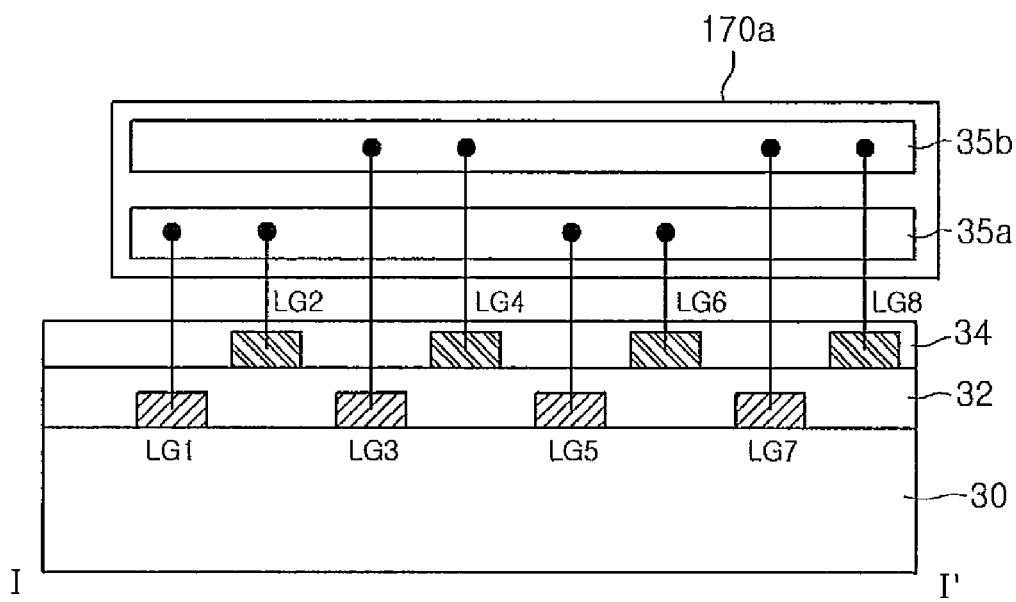
FIG. 5A is a cross-sectional view taken along line I-I' of FIG. 3 and simultaneously a magnified plan view of a portion B of FIG. 3, showing the connection relationship between the auto probe pad and the gate link lines formed according to an embodiment of the present disclosure.

The connection relationship between the link lines and the auto probe pad formed according to an embodiment of the present disclosure is described below in detail with reference to FIGS. 5A and 5B. FIG. 5A is a cross-sectional view taken along line I-I' of FIG. 3 and simultaneously a magnified plan view of a portion B of FIG. 3, showing the connection relationship between the auto probe pad and the gate link lines formed according to an embodiment of the present disclosure.

Referring to FIG. 5A, the gate link lines LG1, LG2, LG3, ..., LGn-2, LGn-1, and LGn respectively connected to the gate lines G1, G2, G3, ..., Gn-2, Gn-1, and Gn are formed on a substrate 30. The gate link lines LG1, LG2, LG3, ..., LGn-2, LGn-1, and LGn are divided into odd-numbered gate link lines LG1, LG3, LG5, etc. and even-numbered gate link lines LG2, LG4, LG6, etc. The odd-numbered gate link lines LG1, LG3, LG5, etc. are directly connected to the gate lines while the even-numbered gate link lines LG2, LG4, LG6, etc. are connected to the gate lines via the contact hole formed in the gate insulation layer 32.

The gate link lines LG1, LG2, LG3, ..., LGn-2, LGn-1, and LGn are connected to the auto probe pad 170a for the gate link lines that is electrically connected to the auto probe of a test equipment. The auto probe pad 170a for the gate link lines includes a first auto probe pad 35a and a second auto probe pad 35b.

The odd-numbered gate link line LG1 and the even-numbered gate link line LG2 are connected to the first auto probe pad 35a. The odd-numbered gate link line LG3 and the even-numbered gate link line LG4 are connected to the second auto probe pad 35b. Accordingly, as the gate link lines formed in the different layers are connected to a single auto probe pad and the adjacent gate link lines are connected to different auto probe pads, short-circuit between the adjacent gate link lines is not generated.

Figure 5B:
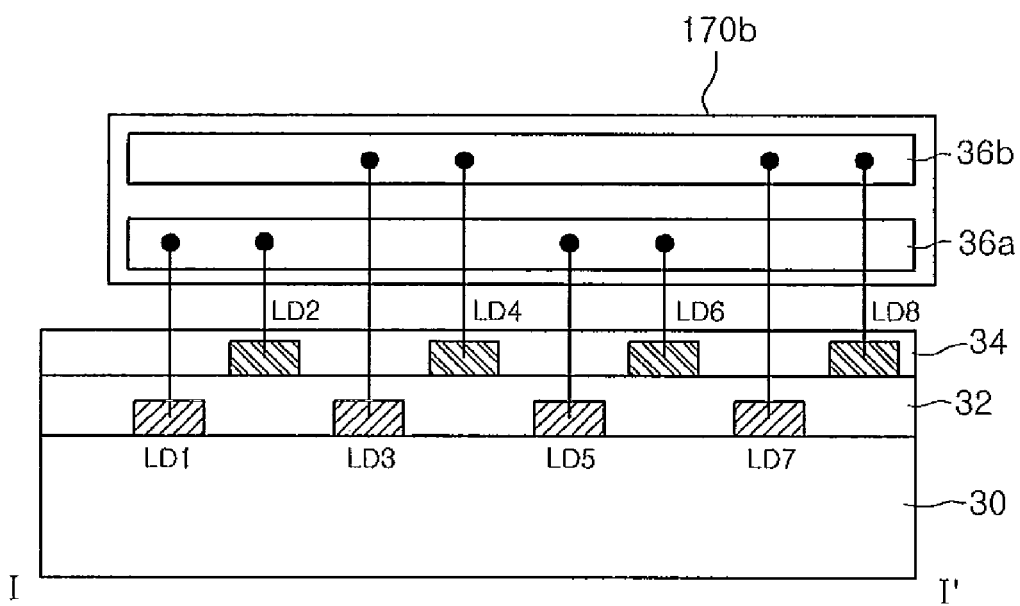
FIG. 5B is a cross-sectional view taken along line I-I' of FIG. 3 and simultaneously a magnified plan view of a portion B of FIG. 3, showing the connection relationship between the auto probe pad and the data link lines formed according to an embodiment of the present disclosure.

FIG. 5B is a cross-sectional view taken along line I-I' of FIG. 3 and simultaneously a magnified plan view of a portion B of FIG. 3, showing the connection relationship between the auto probe pad and the data link lines formed according to an embodiment of the present disclosure. Referring to FIG. 5B, the data link lines have the same structure as that of the gate link lines of FIG. 5A. Also, since the connection relationship between the data link lines and the auto probe pad 170b for the data link lines including a first auto probe pad 36a and a second auto probe pad 36b is the same as that described with reference to FIG. 5A, a detailed description thereof will be omitted herein. Accordingly, the data link lines formed in different layers are connected to a single auto probe pad and the adjacent data link lines are connected to different auto probe pads, short-circuit between the adjacent data link lines is not generated.

In the connection structure between the gate link lines and the auto probe pad formed according to an embodiment of the present disclosure, short-circuit between the first and second gate link lines may be generated as the gate insulation layer is broken. The following embodiment describes the connection relationship between the link lines and the auto probe pad when the insulation layer is broken.

Figure 6A:
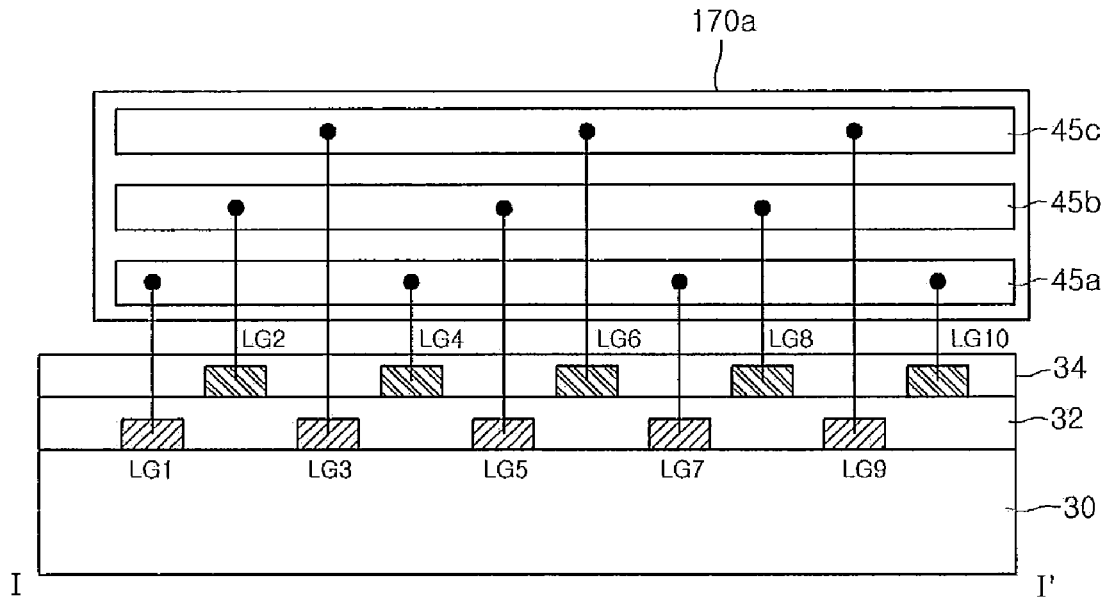
FIG. 6A is a cross-sectional view taken along line I-I' of FIG. 3 and simultaneously a magnified plan view of a portion B of FIG. 3, showing the connection relationship between the auto probe pad and the gate link lines formed according to another embodiment of the present disclosure.

FIG. 6A is a cross-sectional view taken along line I-I' of FIG. 3 and simultaneously a magnified plan view of a portion B of FIG. 3, showing the connection relationship between the auto probe pad and the gate link lines formed according to another embodiment of the present disclosure. Referring to FIG. 6A, the gate link lines LG1, LG2, LG3, ..., LGn-2, LGn-1, and LGn respectively connected to the gate lines G1, G2, G3, ..., Gn-2, Gn-1, and Gn of FIG. 1 are formed on the substrate 30.

The gate link lines LG1, LG2, LG3, ..., LGn-2, LGn-1, and LGn are divided into odd-numbered gate link lines LG1, LG3, LG5, etc. and even-numbered gate link lines LG2, LG4, LG6, etc. The odd-numbered gate link lines LG1, LG3, LG5, etc. are directly connected to the gate lines while the even-numbered gate link lines LG2, LG4, LG6, etc. are connected to the gate lines via the contact hole formed in the gate insulation layer 32.

The gate link lines LG1, LG2, LG3, ..., LGn-2, LGn-1, and LGn are connected to the auto probe pad 170a for the gate link lines that is electrically connected to the auto probe of a test equipment. The auto probe pad 170a for the gate link lines includes a first auto probe pad 45a, a second auto probe pad 45b, and a third auto probe pad 45c.

The odd-numbered gate link line LG1 is connected to the first auto probe pad 45a. The even-numbered gate link line LG2 are connected to the second auto probe pad 45b. The odd-numbered gate link line LG3 is connected to the first auto probe pad 45c. Accordingly, as the gate link lines LG1, LG2, and LG3 are connected to a different auto probe pads and three gate link lines are connected to different auto probe pads that transmit different electric signals, short-circuit between the link lines formed in the same layer may be detected.

Figure 6B:
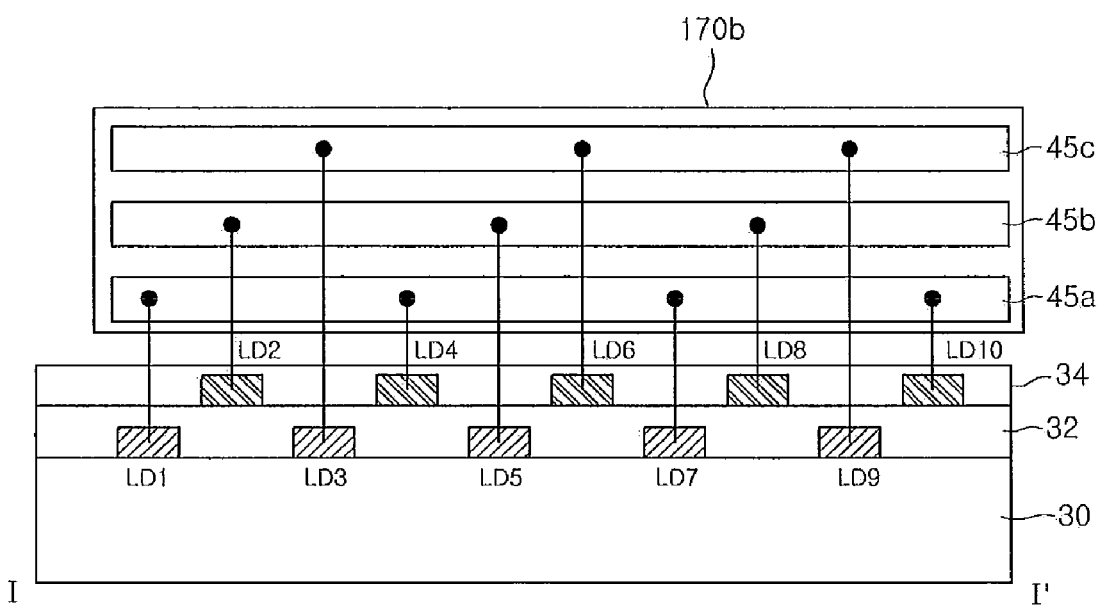
FIG. 6B is a cross-sectional view taken along line I-I' of FIG. 3 and simultaneously a magnified plan view of a portion B of FIG. 3, showing the connection relationship between the auto probe pad and the data link lines formed according to another embodiment of the present disclosure.

FIG. 6B is a cross-sectional view taken along line I-I' of FIG. 3 and simultaneously a magnified plan view of a portion B of FIG. 3, showing the connection relationship between the auto probe pad and the data link lines formed according to another embodiment of the present disclosure. Referring to FIG. 6B, the data link lines have the same structure as that of the gate link lines of FIG. 6A. Also, since the connection relationship between the data link lines and the auto probe pad 170b for the data link lines including the first auto probe pad 45a, the second auto probe pad 45b, and the third auto probe pad 45c is the same as that described with reference to FIG. 6A, a detailed description thereof will be omitted herein. Accordingly, the data link lines LD1, LD2, and LD3 are connected to different auto probe pads and the three data link lines are respectively connected to different auto probe pads that transmit different electric signals, short-circuit between the link lines formed in the same layer may be detected.

As described above, in the LCD device according to an embodiment of the present disclosure, the gate (or data) link lines formed in different layers are connected to a single auto probe pad and the adjacent gate (or data) link lines are connected to different auto probe pads. Therefore, short-circuit between the adjacent gate (or data) link lines is not generated in the LCD device. Also, the gate (or data) link lines are connected to different auto probe pads and the three gate (or data) link lines are respectively connected to different auto probe pads that transmit different electric signals. Accordingly, the LCD device can enable a short-circuit between the link lines formed in the same layer to be detected.

Although the present disclosure has been limitedly explained by the embodiments described above, it will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. An LCD device comprising:
a pixel area in which a plurality of gate lines and a plurality of data lines crossing the plurality of gate lines at a right angle are formed;
a pad area formed at a side of the pixel area;
a gate pad portion and a data pad portion formed in the pad area and respectively connected to the plurality of gate lines and the plurality of data lines;
first, second, third, and fourth gate link lines connected to the plurality of gate lines and the gate pad portion and alternately arranged with an insulation layer interposed between the first, second, third, and fourth gate link lines; and
first and second auto probe pads for the first, second, third and fourth gate link lines electrically connected to the first, second, third, and fourth gate link lines,
wherein the first and second gate link lines are included in a first odd-numbered and a first even-numbered gate link lines, respectively, and the third and fourth gate link lines are included in a second odd-numbered and a second even-numbered gate link lines, respectively,
wherein the first and second odd-numbered gate link lines are formed on a first layer, and the first and second even-numbered gate link lines are formed on a second layer, and
wherein the first odd-numbered gate link line and the first even-numbered gate link line are connected to the first auto probe pad, and the second odd-numbered gate link line and the second even-numbered gate link line are connected to the second auto probe pad.

2. The LCD device claimed as in claim 1, further comprising:
first, second, third, and fourth data link lines connected to the plurality of data lines and the data pad portion and alternately arranged with the insulation layer interposed between the first, second, third, and fourth data link lines; and
first and second auto probe pads for the first, second, third, and fourth data link lines electrically connected to the first, second, third, and fourth data link lines,
wherein the first and second data link lines are connected to the first auto probe pad and the third and fourth data link lines are connected to the second auto probe pad.

3. The LCD device claimed as in claim 1, wherein any one of the first and second gate link lines extends from the plurality of gate lines and the other one of the first and second gate link lines is formed on the insulation layer interposed between the first and second gate link lines.

4. The LCD device claimed as in claim 2, wherein any one of the first and second data link lines extends from the plurality of data lines and the other one of the first and second data link lines is formed on the insulation layer interposed between the first and second data link lines.

5. An LCD device comprising:
a pixel area in which a plurality of gate lines and a plurality of data lines crossing the plurality of gate lines at a right angle are formed;
a pad area formed at a side of the pixel area;
a gate pad portion and a data pad portion formed in the pad area and respectively connected to the plurality of gate lines and the plurality of data lines;
first, second, third and fourth gate link lines connected to the plurality of gate lines and the gate pad portion and alternately arranged with an insulation layer interposed between the first, second, third and fourth link lines; and
first, second, and third auto probe pads for the first, second, and third gate link lines electrically connected to the first, second, and third gate link lines,
wherein the first and second gate link lines are included in a first odd-numbered and a first even-numbered gate link lines are included in a second odd-numbered and a second even-numbered gate link lines, respectively, wherein the first and second odd-numbered gate link lines are formed on a first layer, and the first and second even-numbered gate link lines are formed on a second layer, and wherein the first odd-numbered gate link line and the second even-numbered gate link line are connected to the first auto probe pad, the first even-numbered gate link line is connected to the second auto probe pad, and the second odd-numbered gate link line is connected to the third auto probe pad.

6. The LCD device claimed as in claim 5, further comprising:

first, second, and third data link lines connected to the plurality of data lines and the data pad portion and alternately arranged with an insulation layer interposed between the first, second, and third data link lines; and first, second, and third auto probe pads for the first, second and third data link lines electrically connected to the first, second, and third data link lines, wherein the first data link line is connected to the first auto probe pad, the second data link line is connected to the second auto probe pad, and the third data link line is connected to the third auto probe pad.

7. The LCD device claimed as in claim 5, wherein any one of the first and second gate link lines extends from the plurality of gate lines and the other one of the first and second gate link lines is formed on the insulation layer interposed between the first and second gate link lines.

8. The LCD device claimed as in claim 6, wherein any one of the first and second data link lines extends from the plurality of data lines and the other one of the first and second data link lines is formed on the insulation layer interposed between the first and second data link lines.

* * * * *